United States Patent [19]

Pettersson

[11] Patent Number: 5,224,402
[45] Date of Patent: Jul. 6, 1993

[54] SCREW AND SCREWDRIVER THEREFOR
[75] Inventor: Lars T. Pettersson, Glen Rock, N.J.
[73] Assignee: Sandvik Aktiebolag, Sandviken, Sweden
[21] Appl. No.: 577,530
[22] Filed: Sep. 5, 1990
[51] Int. Cl.5 .............................................. B25B 23/14
[52] U.S. Cl. ......................................... 81/467; 81/436
[58] Field of Search ........................... 81/436, 467, 58; 411/403

[56] References Cited

U.S. PATENT DOCUMENTS

| | | |
|---|---|---|
| 2,921,984 | 12/1959 | Ansingh . |
| 4,700,442 | 10/1987 | Lahm ..................... 29/568 |
| 4,827,811 | 5/1989 | Vickers ................... 81/436 |
| 4,834,597 | 5/1989 | Andersson et al. . |

FOREIGN PATENT DOCUMENTS

| | | |
|---|---|---|
| 2608892 | 9/1977 | Fed. Rep. of Germany ...... 411/403 |
| 747810 | 6/1933 | France . |
| 113786 | 2/1926 | Switzerland ........................ 81/436 |
| 753367 | 7/1956 | United Kingdom . |

Primary Examiner—D. S. Meislin
Attorney, Agent, or Firm—Burns, Doane, Swecker & Mathis

[57] ABSTRACT

A screw includes a socket adapted to receive the tip of a screwdriver. The socket is tapered and formed by a plurality of sides interconnected by rounded corners. Each side is configured as a surface of a segment of a cone having a cone angle of at least three degrees. The screwdriver tip is configured correspondingly to the screw socket. The screwdriver may be mounted in a power driven rotary arm and spring-biased, whereby a tightened screw applies a rearward reaction force to the screwdriver, causing the tip to be displaced from the screw socket and thereby limit the torque applied to the screw.

4 Claims, 1 Drawing Sheet

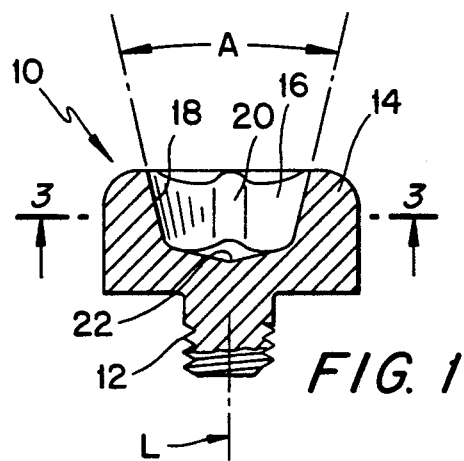
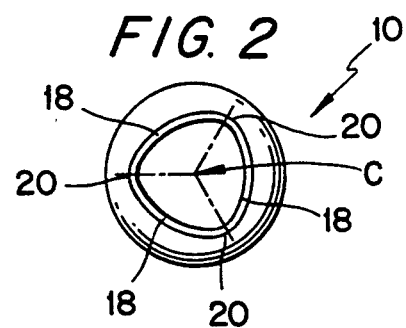
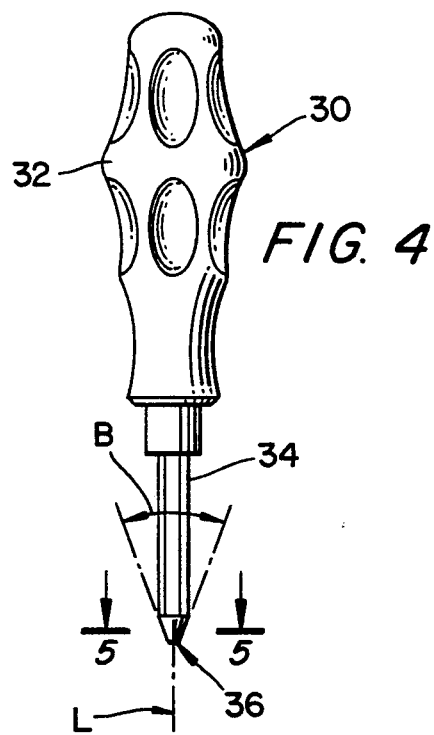
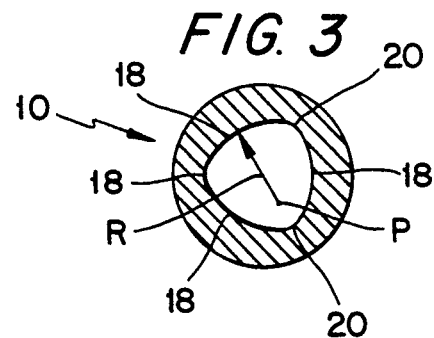
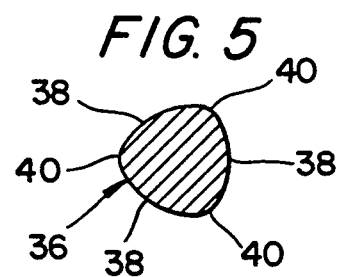
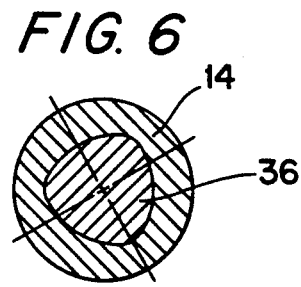
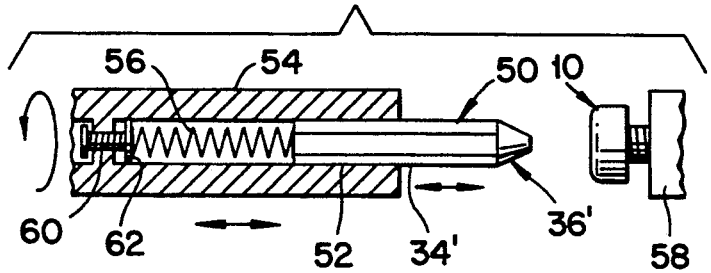

SCREW AND SCREWDRIVER THEREFOR

BACKGROUND OF THE INVENTION

The present invention relates to screws and to screwdrivers for applying torque to the screws by manual or mechanical force.

A screwdriver for applying torque to a screw typically comprises a shank whose free end or tip is configured in complementary fashion to a socket formed in a head of the screw so as to be capable of mating with, and transmitting torque to, the screw.

Manual screwdrivers which are commercially available include, at their tips, drive surfaces which face in the direction of rotation to engage correspondingly oriented driven surfaces of the screwdriver. For example, a flat-headed screwdriver possesses radially extending drive surfaces which face in the direction of rotation; Torx and Phillips screwdrivers possess longitudinally extending drive surfaces which face in the direction of rotation. The tips of the Torx and Phillips screwdrivers may possess a taper, e.g., from 10° to 50°, to facilitate entry of the tip into the screw socket.

Further, there have been proposed so-called tamper-resistant screws which so termed that because they resist being unscrewed by conventionally shaped screwdriver tips. For example, as disclosed in German OS 26 08 892, a screw is provided with a multi-lobed socket each lobe of which is configured as a segment of a cone having a taper (i.e., cone angle of approximately 3°). The screwdriver tip has multiple sides correspondingly curved to mate with the screw socket. In that type of arrangement, there are no torque-transmitting surfaces facing in the direction of rotation. Rather, the torque is transmitted from a radially outwardly facing surface on the screwdriver to a radially inwardly facing surface in the screw socket. However, the curved sides of the screwdriver intersect one another to form generally sharp edges. Since, as noted above, the torque is transmitted between radially facing surfaces, there may occur a tendency for the screwdriver to be cammed out of the socket during a turning operation. As that occurs, the sharp edges will tend to cut the lobes of the screw socket in a manner causing the socket to become rounded and thus unable to be properly driven by the screwdriver.

It would be desirable to provide a screwdriver/screw arrangement of the latter type which is easier to make and use and which minimizes any tendency for the screwdriver tip to cut the sides of the screw socket.

Screwdrivers have also been utilized in automated equipment, as exemplified by Lahm U.S. Pat. No. 4,700,442. In order to regulate the torque applied to the screw, the screwdriver includes two shank sections rotatably interconnected by inclined slide faces. The two shank sections are yieldably urged together by a spring. When the rotary torque exceeds a threshold value, the slide faces move axially relative to one another and terminate the application of torque to the screw. However, such a mechanism increases the complexity and number of components of the mechanism.

It would be desirable to provide for automatic torque regulation in automated equipment without the need for forming the screwdriver in multiple parts.

SUMMARY OF THE INVENTION

The present invention relates to a screw, a screwdriver, the combination of a screw and screwdriver, and an apparatus including a power-driven rotary arm for carrying a screwdriver.

The screw comprises a threaded post and a head disposed at a rear end of the post. The head has a socket adapted to receive a tip of a screwdriver. The socket is tapered and formed by a plurality of sides interconnected by rounded corners. Each of the sides is configured as a surface of a segment of a cone having a cone angle of at least 3°.

A screwdriver according to the invention comprises a shank having a tip adapted to be received in a correspondingly shaped socket of a screw. The tip is tapered and is formed by a plurality of sides interconnected by rounded corners. Each of the sides is configured as a surface of a segment of a cone having a cone angle of at least 3°.

The present invention also involves a machine for rotating screws. The machine comprises a power driven rotary arm rotatable about a longitudinal axis. A screwdriver is mounted to the arm for rotation therewith and is movable relative thereto along the longitudinal axis. The screwdriver includes a tip adapted to be received in a correspondingly shaped screw socket. The tip is tapered and formed by a plurality of sides interconnected by rounded corners. Each of the sides is configured as a surface of a segment of a cone having a cone angle of at least 10°. A torque regulating mechanism is provided for regulating the amount of torque applied to the screw. The torque regulating mechanism comprises a spring biasing the screwdriver forwardly and being yieldable rearwardly in response to the tip being displaced from the screw socket by a predetermined reaction force applied to the tip by a tightened screw.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which:

FIG. 1 is a longitudinal sectional view through a screw according to the present invention;

FIG. 2 is a plan view of the screw depicted in FIG. 1;

FIG. 3 is a cross-sectional view taken along the line 3—3 in FIG. 1;

FIG. 4 is a side elevational view of a hand-held screwdriver according to the present invention;

FIG. 5 is a cross-sectional view taken along the line 5—5 in FIG. 4;

FIG. 6 is a cross-sectional view taken through a screwdriver tip which is nested within a screw according to the present invention; and FIG. 7 is a schematic longitudinal sectional view taken through a power driven rotary arm of a machine carrying a screwdriver according to the present invention.

DETAILED DESCRIPTION OF A PREFERRED EMBODIMENT OF THE INVENTION

A screw 10 according to the present invention is depicted in FIGS. 1-3, and a hand-held screwdriver according to the present invention for applying torque to the screw is depicted in FIGS. 4 and 5.

The screw 10 includes a threaded post 12 which extends axially from an enlarged head 14. The head includes a central socket 16 for receiving a tip of the screwdriver. The socket comprises a plurality of curved sides or lobes 18 interconnected by rounded corners 20. Each side is configured as a surface of a segment of a truncated cone, with the cone axes of the various segments being non-coincident. Preferably, the socket has three sides and three corners, whereby the socket may be considered as being of tri-lobed shape. A cross-section taken through the head 14 (FIG. 3) shows that at any given axial position along the socket, each side 18 is generated by the rotation of a radius R about a point P which is spaced from the geometric center C of the socket. That point can be spaced from the center C in a direction toward or away from the respective side 18 being generated. The radii R for all of the sides would have equal lengths within a given cross-sectional plane.

The socket 16 is tapered from its open end to its floor 22, i.e., each cone segment which defines one of the sides 18 has a cone angle A. Thus, the length of the radius R of each side 18 becomes progressively smaller as the floor 22 is approached. The size of the cone angle A is at least 3°, which is large enough to enable the screw head to be economically manufactured by a cold-forging process. Furthermore, the entry of the screw driver tip into the socket is facilitated by such a taper.

The hand-held screwdriver 30 includes a manually grippable handle 32 which carries a metal shank 34. The shank 34 terminates in a free end or tip 36 which is configured in a complementary fashion relative to the socket 16. That is, the tip includes a number of sides or lobes 38 interconnected by rounded corners 40, the shape and number of sides and corners corresponding to those of the socket. Thus, the sides are shaped as segments of a truncated cone. Each lobe 38 is tapered to define a cone angle B which corresponds to the taper A of the socket. The sides 38 are generated by radii which correspond to those of the socket so that the tip 36 may nest snugly within the socket, as depicted in FIG. 6 which constitutes a cross-section through the screw head 14 and a screwdriver tip 36 nested therein.

It will be appreciated that the torque-transmitting sides and corners of the screwdriver tip and socket face radially outwardly. Thus, all of the torque is transmitted between radially outwardly facing sides and corners which are tapered longitudinally toward the longitudinal axis L. Consequently, upon the application of a torque from the sides and corners of the tip 36 to the sides and corners of the socket, the sides and corners of the socket apply to the screwdriver tip a reaction force having an axially rearwardly directed component which tends to push the screwdriver out of the socket. The magnitude of that rearward axial force is a function of the size of the cone angle A, B, i.e., the larger the angle, the greater the axial force. In the case of a hand-held screwdriver 30, that force can be overcome by the manual application of a sufficiently large forward axial force to the handle 32.

By making the corners 40 of rounded configuration, the ability of the screw driver tip to cut the sides of the screw socket is minimized. Thus, there is less risk that the socket will become rounded to the extent of being incapable of receiving rotary forces from the screwdriver.

In the case of a machine-driven screwdriver 50 (see FIG. 7) having a tip 36' corresponding in shape to the previously described tip 36, the imposition of the axially rearward reaction force can be used to advantage in achieving a limitation of the torque applied to the screw. In fact, the size of the cone angle is increased, e.g., to at least about 10° to increase the rearward reaction force. The screwdriver 50 includes a shank 34' mounted within a bore 52 of a rotary arm 54, the arm being motor-driven within a machine. The shank and bore can be of non-circular cross-sectional shape to prevent relative rotation between the shank and arm 54. The shank 34' is linearly movable within the bore 52 and is biased forwardly by a spring 56. The arm 54 is movable toward a screw 10 which is mounted in a member 58. The member 58 may comprise a workpiece being fastened by the screw, or a permanent component of the machine which is being adjusted in some fashion by rotation of the screw. The spring 56 applies a sufficient bias to the shank 34' to maintain the tip 36' within the screw socket during the screw rotating step. As the screw becomes tightened, the resistance to turning increases the axial push-out or reaction force applied to the shank 34' increases. By selecting a suitable spring force for the spring 56, the torque at which the spring 56 yields to enable the tip to exit the screw socket can be preset. As a result, an automatic limitation of the applied torque is achieved without the need for slip-type clutches previously employed for that purpose. If desired, the ability to adjust the spring force can be provided, e.g., by the provision of an adjusting screw 60 which displaces a plate 62 to change the compression of the spring 56.

Movement of the tip 36' out of the screw socket does not result in any appreciable deformation of the socket walls, because the corners of the screwdriver are rounded rather than being pointed, and thus will not cut into the socket walls.

In the event that the tip 36' is not angularly aligned relative to the screw socket when the tip is initially advanced against the screw, the spring 56 enables the screwdriver to retract. During subsequent rotation of the screwdriver, the tip becomes angularly aligned with the socket and snaps into place.

It will be appreciated that the present invention provides a screw and screwdriver whose socket and tip, respectively, are uniquely shaped to facilitate manufacture and use. That is, the provision of a socket and tip having radially outwardly facing force transmitting surfaces tapered by at least 3° enable the screw and screwdriver to be made easily by cold forging, and to be axially mated without difficulty. The rounded corners on the screwdriver tip prevent the tip from cutting into the screw socket. Furthermore, the unique shape of the screwdriver tip and screwdriver socket is utilized in combination with a spring to produce a torque-limiting action in automated equipment.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. Apparatus for rotating screws, comprising:
   a power-driven rotary arm rotatable about a longitudinal axis;
   a screwdriver mounted to said rotary arm for rotation therewith and being movable relative thereto along said longitudinal axis, said screwdriver including a tip adapted to be received in a correspondingly shaped screw socket, said tip being tapered and formed by a plurality of sides interconnected by rounded corners, each said side configured as a surface of a segment of a cone having a cone angle of at least ten degrees; and torque regulating means for regulating the amount of torque applied to the screw comprising spring means biasing said screwdriver forwardly and being yieldable rearwardly in response to said tip being displaced from the screw socket by a predetermined reaction force applied to said tip by a tightened screw.

2. Apparatus according to claim 1, wherein there are three said sides.

3. Apparatus according to claim 1, wherein each of said sides is configured as a surface of a segment of a truncated cone.

4. Apparatus according to claim 1 including means for adjusting a spring force of said spring means.

* * * * *